US009649891B2

(12) United States Patent
Bourgeois

(10) Patent No.: US 9,649,891 B2
(45) Date of Patent: May 16, 2017

(54) TIRE WITH BEAD HAVING SPECIFIED BEAD FILLER AND RIGIDIFYING REINFORCEMENT

(75) Inventor: Frédéric Bourgeois, Chamalieres (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 672 days.

(21) Appl. No.: 13/513,841

(22) PCT Filed: Nov. 29, 2010

(86) PCT No.: PCT/EP2010/068424
§ 371 (c)(1),
(2), (4) Date: Aug. 6, 2012

(87) PCT Pub. No.: WO2011/067211
PCT Pub. Date: Jun. 9, 2011

(65) Prior Publication Data
US 2012/0325390 A1   Dec. 27, 2012

(30) Foreign Application Priority Data
Dec. 3, 2009   (FR) ...................................... 09 58633

(51) Int. Cl.
*B60C 15/00* (2006.01)
*B60C 15/06* (2006.01)
(52) U.S. Cl.
CPC .......... *B60C 15/06* (2013.01); *B60C 15/0009* (2013.04); *B60C 15/0603* (2013.04);
(Continued)

(58) Field of Classification Search
CPC ............ B60C 15/0009; B60C 15/0027; B60C 15/0603; B60C 15/0628; B60C 15/0632;
(Continued)

(56) References Cited

U.S. PATENT DOCUMENTS 3,517,721 A  *  6/1970  Woodhall
5,379,819 A      1/1995  Adachi
(Continued)

FOREIGN PATENT DOCUMENTS

CN       1659047       8/2005
WO    WO-2009/037254 A1 *  3/2009
WO    WO-2011/067211 A2 *  6/2011

OTHER PUBLICATIONS

Online definition of around, Collins Thesaurus of the English Language-Complete and Unabridged, 2$^{nd}$ ed., HarperCollins Publishers, 2002.*

*Primary Examiner* — Adrienne C Johnstone
(74) *Attorney, Agent, or Firm* — Cozen O'Connor

(57) ABSTRACT

Tire having two beads having an annular reinforcing structure and a carcass reinforcement anchored in the two beads by a turn-up. Each bead has a bead rubber filler extending a radial distance from the radially innermost point of the annular reinforcing structure of the bead. The radial distance is not more than 10% of the tire's radial height. A sidewall has rigidifying metal reinforcing elements oriented along an angle not more than 10° to the circumferential direction and positioned with the distance between the radially innermost point of the annular reinforcing structure and the radially outer end of the rigidifying reinforcement between 20% and 40%, inclusive, of the tire's radial height and with the distance between the radially innermost point of the annular reinforcing structure and the radially inner end of the rigidifying reinforcement not more than 20% of the tire's radial height.

11 Claims, 6 Drawing Sheets

(52) U.S. Cl.
CPC ...... *B60C 15/0628* (2013.04); *B60C 15/0054* (2013.04); *B60C 2015/009* (2013.04); *B60C 2015/061* (2013.04); *B60C 2015/065* (2013.04); *B60C 2015/0639* (2013.04); *B60C 2015/0646* (2013.04); *B60C 2015/0657* (2013.04); *B60C 2015/0675* (2013.04); *B60C 2015/0692* (2013.04); *Y10T 152/10828* (2015.01); *Y10T 152/10837* (2015.01); *Y10T 152/10864* (2015.01)

(58) Field of Classification Search
CPC . B60C 15/0635; B60C 15/0653; B60C 13/00; B60C 2015/009; B60C 2015/061; B60C 2015/0657; B60C 2015/0692; B60C 15/06; B60C 15/00; Y10T 152/10828; Y10T 152/10837; Y10T 152/10864
USPC ................ 152/541–543, 546, 552, 554, 555
See application file for complete search history.

(56) References Cited

U.S. PATENT DOCUMENTS

| | | | |
|---|---|---|---|
| 5,415,216 A | 5/1995 | Kajiwara et al. | |
| 5,431,209 A | 7/1995 | Kajiwara et al. | |
| 6,443,204 B1* | 9/2002 | Auxerre | 152/543 X |
| 6,935,394 B2 | 8/2005 | Durif et al. | |
| 6,986,375 B2* | 1/2006 | Maruoka et al. | 152/552 X |
| 7,152,647 B2* | 12/2006 | Maruoka et al. | 152/552 |

* cited by examiner

US 9,649,891 B2

TIRE WITH BEAD HAVING SPECIFIED BEAD FILLER AND RIGIDIFYING REINFORCEMENT

RELATED APPLICATIONS

This is a U.S. national stage of application No. PCT/EP2010/068424, filed 29 Nov. 2010. Priority is claimed on the following applications: French Application No. 0958633 filed on 3 Dec. 2009 and U.S. Provisional Application No. 61/306,209 filed on 19 Feb. 2010.

FIELD OF THE INVENTION

The present invention relates to tires for passenger vehicles, and especially the beads of these tires.

BACKGROUND

The reduction in greenhouse gas emissions from transportation is one of the major challenges which vehicle manufacturers find themselves facing today. The tire constitutes a significant source of progress, by means of a reduction in the rolling resistance, since this has a direct impact on the vehicle fuel consumption. Some notable advances have been obtained, as is witnessed, for example, by the great success of the Energy™ Saver tire commercialized by Michelin. The technology used makes it possible to save close to 0.2 l of fuel per 100 km in mixed cycle, which corresponds to a reduction of close to 4 g of $CO_2$ per km, or about one ton of $CO_2$ not emitted into the atmosphere during the life of a vehicle.

Considering the foreseeable increase in the price of oil and the ever-increasing ecological awareness of consumers, it is nevertheless necessary to continue the efforts that aim to reduce the rolling resistance of tires.

The assembly formed by the bead and the radially inner part of the sidewall of a tire is among the components of the tire whose structure has a very marked repercussion on the rolling resistance of the tire. It has a multiple role: it takes up the stresses of the carcass reinforcement and transmits the loads to which the tire is subjected from the sidewall to the rim. Its influence on the road-holding of the tire is considerable, especially when the tire is highly loaded. All of these functions are customarily provided by the combination of a reinforcement (comprising the bead wire and the turn-up of the carcass reinforcement around it) and of a "bead filler" made of a rubber compound. The compromise between the rigidity to be achieved, in particular for the guidance of the crown, and the expected endurance generally leads to choosing a certain trajectory of the carcass reinforcement and to using a voluminous (high and/or thick) and rigid bead filler. Unfortunately, this geometry entails a high hysteretic loss, especially at the bead filler. In a radially outer region remote from the bead wire, the rigidifying effect provided by the bead wire and the turn-up of the carcass reinforcement is reduced. In order to obtain sufficient rigidification in this region, the bead filler has to be even more voluminous, which results in an even greater hysteretic loss.

SUMMARY OF THE INVENTION

One of the objects of the present invention is to provide a tire for passenger vehicles that has a very low rolling resistance. This object is achieved by reducing the volume of the bead filler as much as possible and by providing a reinforcement of very low hysteresis which is suitable for taking over the rigidifying role of the bead filler.

More specifically, this object is achieved by a tire comprising:

two beads designed to come into contact with a mounting rim, each bead comprising at least one annular reinforcing structure;

two sidewalls extending from the beads radially outward, the two sidewalls joining in a crown comprising a crown reinforcement, surmounted by a tread;

at least one carcass reinforcement extending from the beads through the sidewalls to the crown, the carcass reinforcement comprising a plurality of carcass reinforcing elements and being anchored in the two beads by a turn-up around the annular reinforcing structure in such a way as to form in each bead a main portion and a wrapped-around portion, each wrapped-around portion extending radially outward to an end located at a radial distance DRE from the radially innermost point of the annular reinforcing structure of the bead, the radial distance DRE being greater than or equal to 5% and less than or equal to 20% of the radial height H of the tire, and preferably greater than or equal to 7% and less than or equal to 18% of the radial height H of the tire.

Each bead comprises a bead filler formed from a rubber compound that preferably has a modulus of elasticity greater than or equal to 40 MPa and less than or equal to 60 MPa, the bead filler being located, at least partially, radially outside of the annular reinforcing structure and at least partially between the main portion and the wrapped-around portion of the carcass reinforcement, the bead filler extending radially up to a radial distance DBE from the radially innermost point of the annular reinforcing structure of the bead, the radial distance DBE being less than or equal to 10% of the radial height H of the tire.

At least one sidewall, and preferably both sidewalls, of the tire also comprises a rigidifying reinforcement formed from a plurality of metal reinforcing elements oriented along an angle less than or equal to 10 degrees (and preferably less than or equal to 5 degrees) relative to the circumferential direction, this rigidifying reinforcement being positioned such that the distance DAE between the radially innermost point of the annular reinforcing structure and the radially outer end of the rigidifying reinforcement is greater than or equal to 20% and less than or equal to 40% of the radial height H of the tire—and preferably greater than or equal to 25% and less than or equal to 35% of the radial height H of the tire—and such that the distance DAI between the radially innermost point of the annular reinforcing structure and the radially inner end of the rigidifying reinforcement is less than or equal to 20% of the radial height H of the tire.

The drop in the rolling resistance is essentially due to the reduction of the volume of the bead filler. Indeed, the bead filler is conventionally formed from a rubber compound of high hysteresis. When the bead filler is deformed, it therefore dissipates a large amount of energy. A reduction in the volume of the bead filler would induce a drop in the cornering stiffness of the tire. In a tire according to the invention, the cornering stiffness is astutely maintained by the presence of the metallic rigidifying reinforcement.

According to one advantageous embodiment, the bead filler has an axial thickness E(r), this axial thickness corresponding to the length of the intersection of the bead filler with a straight line parallel to the axis of rotation of the tire and having an intersection with the bead filler at a radial distance r from the radially innermost point of the annular reinforcing structure, the axial thickness E(r) being such that, in the range of distances r between 0% and 10% of the radial height H of the tire, the variation of the axial thickness $$\frac{\partial E(r)}{\partial r}$$

is less than or equal to −0.5 mm/mm over at least 3% of the radial height H of the tire.

Good results have also been obtained with a tire in which the bead filler has an axial thickness E(r), this axial thickness corresponding to the length of the intersection of the bead filler with a straight line parallel to the axis of rotation of the tire and having an intersection with the bead filler at a radial distance r from the radially innermost point of the annular reinforcing structure, the value of the axial thickness E(r) being such that, in the range of distances r between 0% and 10% of the radial height H of the tire, the variation of the axial thickness $$\frac{\partial E(r)}{\partial r}$$

is less than or equal to −1 mm/mm over at least 1.5% of the radial height H of the tire.

Surprisingly, it has been observed that the reduction in the rolling resistance is particularly significant when the rigidifying reinforcement is "split", that is to say composed of a plurality of discontinuous reinforcing elements, these reinforcing elements being positioned in a plurality of circles concentric to the axis of rotation of the tire. This effect is not yet completely understood: it appears to be linked to the controlled reduction of the extensional rigidities of the rigidifying reinforcement made possible by the splitting.

Unexpectedly, excellent results are obtained when the splitting of the rigidifying reinforcement corresponds to that made in certain complementary reinforcements of tires of civil engineering vehicles with a view to improving their endurance, as is taught in document U.S. Pat. No. 6,935,394 B2 (also published as WO 03/103990 A1), which is incorporated herein by reference. In a tire according to this advantageous embodiment, the rigidifying reinforcement is composed of a plurality of discontinuous reinforcing elements of length L0, these reinforcing elements being positioned in a plurality of circles (C, C1, C2) concentric to the axis of rotation of the tire mounted on its rim, each circle being defined by an average radius (R, R1, R2) measured relative to said axis of rotation, each discontinuous reinforcing element of length L0 located in a circle C of radius R being mechanically coupled over the coupling lengths L11 and L12, respectively, with two discontinuous reinforcing elements located in a circle C1 of radius R1 less than the radius R, said circle being immediately adjacent to the circle C, wherein the coupling lengths L11 and L12, L11 being greater than or equal to L12, bear out the following relationship: 1.5≤K≤4 with K=(1−L12/L0)/(1−L11/L0).

By respecting this relationship for all the discontinuous reinforcements of all the circles, an optimal distribution of the ends of the discontinuous reinforcing elements is obtained.

This optimal distribution may be achieved by placing the rigidifying reinforcement on the tire blank shaped as a torus or else on a building drum before shaping said rigidifying reinforcement.

This relationship applies whether or not the length L0 is identical for all the cables.

More preferably still, K is such that 2≤K≤2.5.

Of course, when it is stated that the reinforcing elements are positioned in concentric circles, it should be understood that these reinforcing elements may be placed on spirals and that each reinforcing element is positioned on a curve similar to an arc of a circle.

According to one particularly advantageous embodiment, each discontinuous reinforcing element of length L0 located in a circle C of radius R is mechanically coupled over coupling lengths L11 and L12 with two discontinuous reinforcing elements located in a circle C1 of radius R1, the circle immediately adjacent to the circle C, the coupling length L11 being greater than or equal to 55% of L0 and less than or equal to 75% of L0, and the coupling length L12 being greater than or equal to 10% of L0 and less than or equal to 30% of L0; and each discontinuous reinforcing element of length L0 located in a circle C of radius R is mechanically coupled over coupling lengths L21 and L22 with two discontinuous reinforcing elements located in a circle C2 of radius R2, the circle immediately adjacent to the circle C1, the coupling length L21 being greater than or equal to 20% of L0 and less than or equal to 40% of L0, and the coupling length L22 being greater than or equal to 45% of L0 and less than or equal to 65% of L0.

Excellent results are obtained when the mounting rim comprises a part that forms a rim seat comprising a rim flange of substantially circular profile, and when the radially outer end of the rigidifying reinforcement is located on a straight line J2 that passes through the center J of the profile of the rim flange and makes an angle α (alpha) that is open axially toward the inside and radially toward the outside, the angle α (alpha) being greater than or equal to 90° and less than or equal to 120°, and preferably greater than or equal to 100° and less than or equal to 115°.

Of course, it is possible and even desirable to combine two or more of the embodiments described.

DETAILED DESCRIPTION OF THE DRAWINGS

Figure 1:
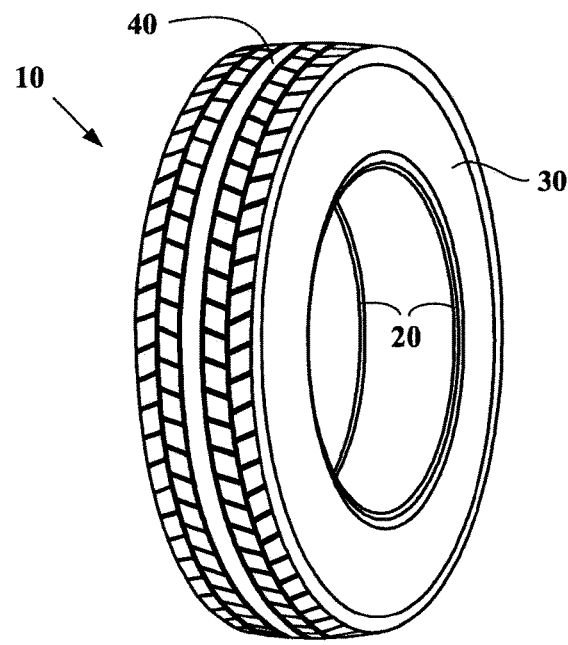
FIG. 1 represents a tire according to the prior art.

When the term "radial" is used, it is important to distinguish between several different uses of the word among those skilled in the art. Firstly, the expression refers to a radius of the tire. It is in this sense that a point P1 is said to be "radially inside" of a point P2 if it is nearer than point P2 to the axis of rotation of the tire. Conversely, a point P3 is said to be "radially outside" of a point P4 (or "radially on the outside" of a point P4) if it is further than point P4 from the axis of rotation of the tire. It will be said that one advances "radially inward (or outward)" when one advances in the direction of smaller (or larger) radii. When radial distances are being discussed, this meaning of the term also applies.

However, a thread or reinforcement is said to be "radial" when the thread or reinforcing elements of the reinforcement form with the circumferential direction an angle greater than or equal to 80° and less than or equal to 90°. It should be noted that in this document the term "thread" should be interpreted in the broadest sense and comprises threads in the form of monofilaments, multifilaments, a cable, a yarn or an equivalent assembly, and this irrespective of the material of which the thread is made or the coating applied to it to enhance its bonding with the rubber.

Lastly, "radial section" here means a section taken along a plane containing the axis of rotation of the tire.

An "axial" direction is a direction parallel to the axis of rotation of the tire. A point P5 is said to be "axially inside" of a point P6 if it is closer than point P6 to the mid-plane of the tire. Conversely, a point P7 is said to be "axially outside" of a point P8 (or "axially on the outside" of a point P8) if it is further than point P8 from the mid-plane of the tire. The "mid-plane" of the tire is that plane which is perpendicular to the axis of rotation of the tire and is equidistant from the annular reinforcing structures of each bead.

A "circumferential" direction is a direction that is perpendicular both to a radius of the tire and to the axial direction. A "circumferential section" is a section taken along a plane perpendicular to the axis of rotation of the tire.

Two reinforcing elements are said to be "parallel" in this document when the angle formed between the two elements is less than or equal to 20°.

The expression "rolling surface" is understood here to mean all the points of the tread of a tire which come in contact with the ground when the tire is rolling.

The expression "rubber compound" means a rubber composition comprising at least one elastomer and at least one filler.

The expression "modulus of elasticity" of a rubber compound is understood to mean the secant tensile modulus obtained under tension according to the standard ASTM D 412 of 1998 (test specimen "C"): the apparent secant moduli at 10% elongation, denoted by "MA10" and expressed in MPa, are measured in second elongation (i.e. after an accommodation cycle) (normal temperature and hygrometry conditions according to the standard ASTM D 1349 of 1999). This modulus of elasticity should be distinguished from the moduli of elasticity obtained in compression, the values of which are in general very different from the moduli obtained in extension.

To facilitate the reading of the description of the variants shown with the figures, the same references are used to denote identical structural elements.

FIG. 1 schematically represents a tire 10 according to the prior art. The tire 10 has a crown comprising a crown reinforcement (not visible in FIG. 1) surmounted by a tread 40, two sidewalls 30 extending from the crown radially inward, and two beads 20 radially inside with respect to the sidewalls 30.

Figure 2:
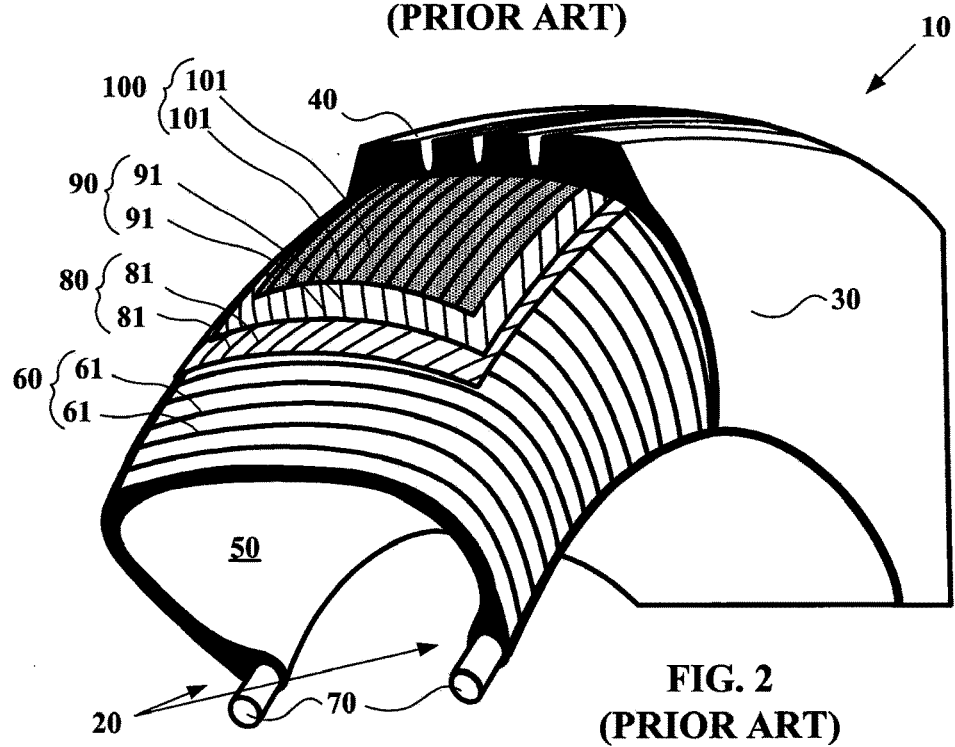
FIG. 2 represents a partial perspective view of a tire according to the prior art.

FIG. 2 schematically represents a partial perspective view of a tire 10 according to the prior art and shows the various components of the tire. The tire 10 comprises a carcass reinforcement 60 consisting of threads 61 coated in rubber compound, and two beads 20, each comprising annular reinforcing structures 70 that keep the tire 10 on the wheel rim (not shown). The carcass reinforcement 60 is anchored to each of the beads 20. The tire 10 also has a crown reinforcement comprising two plies 80 and 90. Each ply 80, 90 is reinforced with filamentary reinforcing elements 81 and 91 that are parallel in each layer and crossed from one layer to the other, making with the circumferential direction angles of between 10° and 70°. The tire also contains a hooping reinforcement 100 which is provided radially outside of the crown reinforcement. This hooping reinforcement is made up of reinforcing elements 101 oriented circumferentially and wound in a spiral. A tread 40 is laid on the hooping reinforcement; it is this tread 40 which provides the contact between the tire 10 and the road. The tire 10 illustrated is a "tubeless" tire: it comprises an "inner liner" 50 made of a rubber compound impermeable to the inflation gas and covering the inside surface of the tire.

Figure 3:
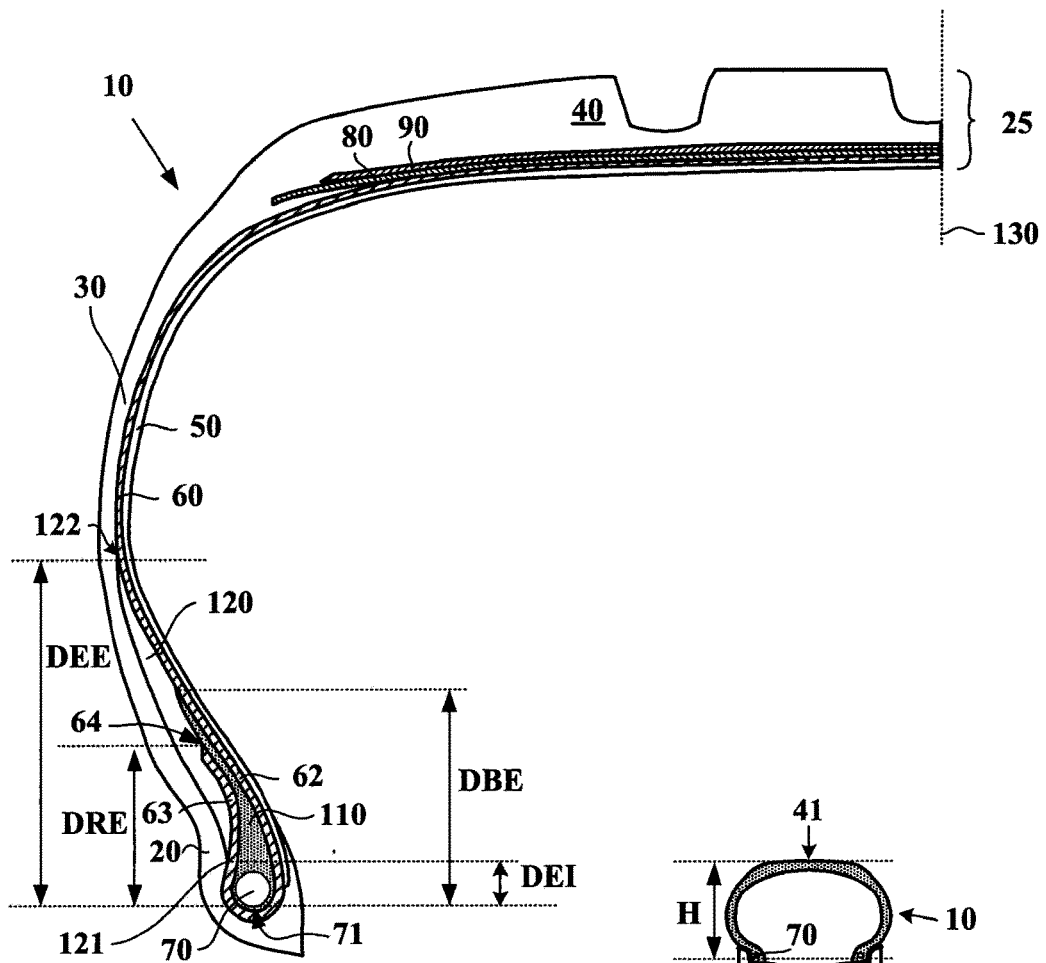
FIG. 3 represents, in radial section, a quarter of a tire according to the prior art.

FIG. 3 schematically represents, in radial cross section, a quarter of a reference tire 10, of the Energy™ Saver type commercialized by Michelin. The tire 10 has two beads 20 designed to be in contact with a mounting rim (not shown), each bead 20 comprising a bead wire 70. Two sidewalls 30 extend from the beads 20 radially outward and join in a crown 25 comprising a crown reinforcement made up of a first layer of reinforcing elements 80 and a second layer of reinforcing elements 90, with a tread 40 surmounting them radially. Each layer comprises filamentary reinforcing elements coated in a matrix formed of rubber compound. The reinforcing elements of each layer are approximately parallel to each other, while the reinforcing elements of the two layers are crossed from one layer to the other at an angle of approximately 20°, as is well known to those skilled in the art of so-called radial tires. The mid-plane of the tire bears the reference 130.

The tire 10 also has a carcass reinforcement 60 that extends from the beads 20 along the sidewalls 30 to the crown 25. This carcass reinforcement 60 here comprises filamentary reinforcing elements oriented approximately radially, meaning that they form with the circumferential direction an angle greater than or equal to 80° and less than or equal to 90°.

The carcass reinforcement 60 comprises a plurality of carcass reinforcing elements anchored in the two beads 20 by a turn-up around the bead wire 70, in such a way as to form in each bead a main portion 62 and a wrapped-around portion 63. The wrapped-around portion 63 extends radially outward to an end 64 which lies at a radial distance DRE from the radially innermost point 71 of the annular reinforcing structure of the bead, the radial distance DRE here being equal to 19% of the radial height H of the tire.

Figure 4:
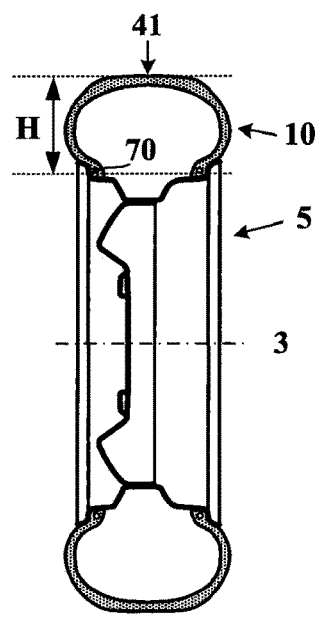
FIG. 4 illustrates how the height H of a tire is determined.

The "radial height" H of a tire is defined as the radial distance from the radially innermost point 71 of the annular reinforcing structure 70 of the bead 20 to the radially outermost point 41 (FIG. 4) of the tread 40 when the tire 10 is mounted on a mounting rim 5 (as depicted in FIG. 4) and inflated to its working pressure.

Each bead comprises a bead filler 110, the bead filler being situated mainly radially on the outside of the bead wire 70 and between the main portion 62 and the wrapped-around portion 63 of the carcass reinforcement 60. Here, the rubber compound used has a modulus of elasticity of 56 MPa.

Each bead also comprises an outer band or layer 120 placed axially on the outside of the carcass reinforcement and of the bead filler. The outer band 120 extends radially outward from a radially inner end 121 situated at a distance DEI from the radially innermost point 71 of the bead wire 70, to a radially outer end 122 situated at a distance DEE from the radially innermost point 71 of the bead wire 70. In this case, the distance DEI is equal to 6.5% and the distance DEE is equal to 41.5% of the radial height H of the tire.

Figures 5, 6:
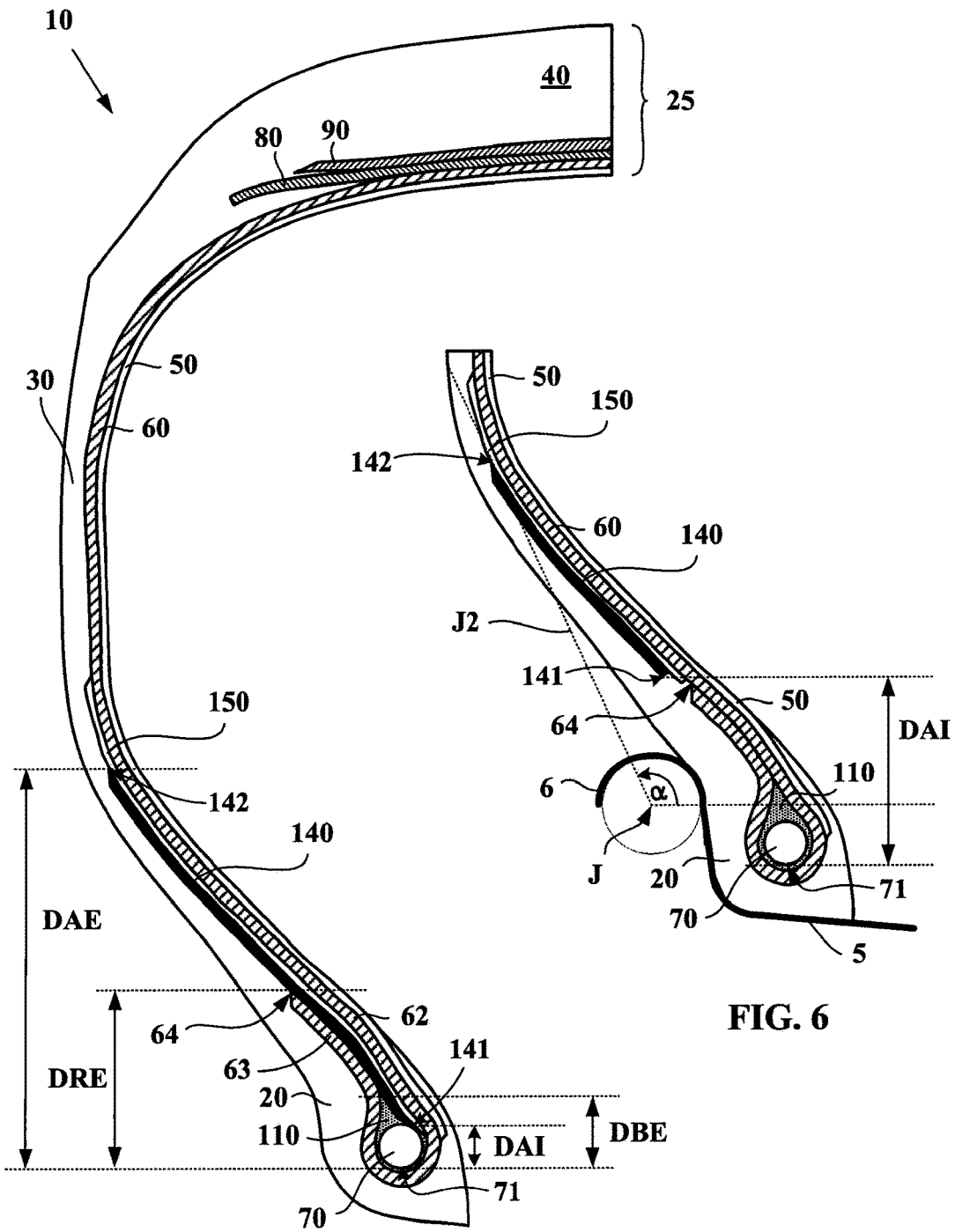
FIGS. 5 to 8 represent, in radial section, a portion of a tire according to an embodiment of the invention.

FIGS. 5 and 6 represent, in radial section, a portion of a tire according to an embodiment of the invention.

FIG. 5 schematically represents a tire 10 comprising two beads 20 (only one of which is represented) designed to be in contact with a mounting rim (not shown), each bead comprising a bead wire 70. Two sidewalls 30 extend from the beads 20 radially outward. The two sidewalls join in a crown 25 comprising a crown reinforcement made up of two plies 80 and 90, surmounted by a tread 40. A carcass reinforcement 60 extends from the beads 20 through the sidewalls 30 to the crown 25. The carcass reinforcement 60 comprises a plurality of carcass reinforcing elements; it is anchored in the two beads 20 by a turn-up around the bead wire 70, in such a way as to form in each bead a main portion 62 and a wrapped-around portion 63. The wrapped-around portion 63 extends radially outward to an end 64 situated at a radial distance DRE from the radially innermost point 71 of the bead wire 70. The radial distance DRE here is equal to 16% of the radial height H of the tire.

The bead 20 comprises a bead filler 110 formed from a rubber compound having a modulus of elasticity greater than or equal to 40 MPa and less than or equal to 60 MPa.

Table I gives, as an example, the composition of a rubber compound that can be used as bead filler. The composition is given in phr ("parts per hundred of rubber"), that is to say, parts by weight per 100 parts by weight of rubber. The corresponding elastic modulus MA10 is also indicated.

TABLE I

|  | Parts in phr |
| --- | --- |
| NR [1] | 100 |
| N 330 [2] | 75 |
| Phenol-formaldehyde resin | 18 |
| Antioxidant (6PPD) [3] | 1 |
| Cobalt Naphthenate | 6 |
| Stearic acid | 0.5 |
| ZnO | 9 |
| HMT3H [4] | 2 |
| Sulfur | 9 |
| Accelerator (TBBS) [5] | 1 |
| MA10 | 52 ± 2 |

Notes to Table I:
[1] Natural rubber
[2] Carbon black series 330 (ASTM)
[3] N-(1,3-dimethylbutyl)-N'-phenyl-p-phenylenediamine
[4] Hexamethylenetetramine
[5] N-tert-butyl-2-benzothiazyl sulfenamide The bead filler is preferably based on at least one diene elastomer, a reinforcing filler and a crosslinking system.

The expression "diene" elastomer (or equally rubber) is understood to mean, in a known manner, an elastomer derived at least partly (i.e. a homopolymer or a copolymer) from diene monomers, that is to say from monomers bearing two conjugated or unconjugated carbon-carbon double bonds. The diene elastomer used is preferably chosen from the group composed of polybutadienes (BR), natural rubber (NR), synthetic polyisoprenes (IR), butadiene-styrene (SBR) copolymers, isoprene-butadiene (BIR) copolymers, isoprene-styrene (SIR) copolymers, butadiene-styrene-isoprene (SBIR) copolymers and blends of these elastomers.

One preferred embodiment uses an "isoprene" elastomer, that is to say an isoprene homopolymer or copolymer, in other words a diene elastomer chosen from the group composed of natural rubber (NR), synthetic polyisoprenes (IR), the different isoprene copolymers and blends of these elastomers.

The isoprene elastomer is preferably natural rubber or a synthetic polyisoprene of the cis-1,4 type. Among these synthetic polyisoprenes, use is preferably made of polyisoprenes having a (mol %) content of cis-1,4 bonds greater than 90%, more preferably still greater than 98%. According to other preferred embodiments, the diene elastomer may be composed, completely or partly, of one other diene elastomer such as, for example, an SBR (E-SBR or S-SBR) elastomer used as a blend or not with another elastomer, for example of BR type.

The rubber composition may also comprise all or some of the additives customarily used in rubber matrices for manufacturing tires, such as for example reinforcing fillers such as carbon black or inorganic fillers such as silica, coupling agents for the inorganic filler, anti-ageing agents, antioxidants, plasticizers or extending oils, whether the latter are of aromatic or non-aromatic nature (in particular oils that are very slightly aromatic or are non-aromatic, for example of the naphthenic or paraffin type, having a high or preferably low viscosity, MES or TDAE oils, plasticizing resins having a high $T_g$ above 30° C.), agents that facilitate the processing (processability) of compositions in the uncured state, tackifying resins, a crosslinking system based either on sulfur or on peroxide and/or sulfur donors, accelerators, vulcanization activators or retarders, antireversion agents, methylene acceptors and donors such as for example HMT (hexamethylenetetramine) or H3M (hexamethoxymethylmelamine), reinforcing resins (such as resorcinol or bismaleimide), known adhesion-promoting systems of the metal salt type for example, in particular cobalt or nickel salts.

The compositions are manufactured in suitable mixers, using two successive preparation stages well known to those skilled in the art: a first thermo-mechanical working or kneading stage (known as "non-productive" stage) at high temperature, up to a maximum temperature between 110° C. and 190° C., preferably between 130° C. and 180° C., followed by a second mechanical working stage (known as a "productive" stage) at a lower temperature, typically below 110° C., during which finishing stage the crosslinking system is incorporated.

By way of example, the non-productive stage is carried out in a single thermomechanical step of a few minutes (for example, between 2 and 10 min) during which all the base constituents required and other additives, apart from the crosslinking or vulcanization system, are introduced into a suitable mixer such as a standard internal mixer. After cooling of the mixture thus obtained, the vulcanization system is then incorporated in an external mixer such as an open mill, kept at low temperature (for example between 30° C. and 100° C.). All the ingredients are then mixed (productive stage) for a few minutes (for example between 5 and 15 min).

The final composition thus obtained is then calendered, for example in the form of a film or sheet for characterization, or else extruded, in order to form the layer or layers of rubber compound used in a tire according to an embodiment of the invention.

Vulcanization (or curing) can then be conducted in a known manner at a temperature of generally between 130° C. and 200° C., preferably under pressure, for a sufficient period which may vary for example between 5 and 90 min depending particularly on the curing temperature, the vulcanization system used and the vulcanization kinetics of the composition in question.

The bead filler 110 is located mainly radially on the outside of the bead wire, between the main portion 62 and the wrapped-around portion 63 of the carcass reinforcement

60. It extends radially up to a radial distance DBE from the radially innermost point 71 of the bead wire 70. The radial distance DBE is here equal to 8% of the radial height H of the tire 10. This low radial height of the bead filler is one of the main features of the tire according to the invention. A bead filler of very reduced volume may be retained, especially for facilitating the manufacture of the whole of the bead, without it leading to a significant hysteretic loss. Indeed, in the immediate surroundings of the bead wire and of the seat of the rim, which are extremely rigid, the deformations undergone during rolling are very low. On the other hand, in order to maintain good handling of the tire, especially under high loads, the general reduction of the bead filler volume is advantageously compensated for by the presence of a supplementary rigidifying reinforcement which itself only generates a small hysteretic loss.

Indeed, the sidewall 30 at any radial height less than or equal to 40% of the radial height H of the tire also comprises a rigidifying reinforcement 140 formed from a plurality of metal reinforcing elements oriented along a zero or small angle, that is to say less than or equal to 10 degrees relative to the circumferential direction. The distance DAE between the radially innermost point 71 of the bead wire 70 and the radially outer end 142 of the rigidifying reinforcement 140 is equal to 35% of the radial height H of the tire 10 and the distance DAI between the radially innermost point 71 of the bead wire 70 and the radially inner end 141 of the rigidifying reinforcement 140 is equal to 4% of the radial height H of the tire 10.

A "decoupling compound" 150 is provided axially between the rigidifying reinforcement 140 and the main portion 62 of the carcass reinforcement 60. By undergoing a shear, this decoupling compound 150 transmits the meridian tension from the carcass reinforcement 60 to the rigidifying reinforcement 140. It therefore limits the transfer stresses between the rigidifying reinforcement 140 and the carcass reinforcement 60 and at the same time regulates the thickness in which these stresses are exerted, which contributes to a better distribution of these stresses.

Figure 9:
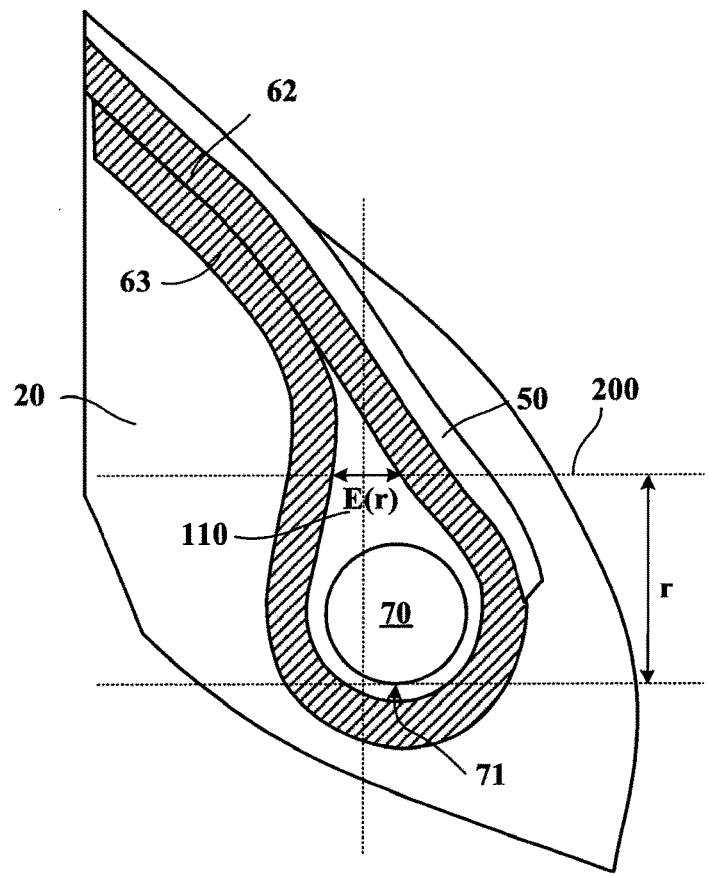
FIG. 9 illustrates how the axial thickness of the bead filler is determined.

The bead filler 110 has an axial thickness E(r) which is determined as illustrated in FIG. 9. The axial thickness E(r) corresponds to the length of the intersection of the bead filler with a straight line 200 which is parallel to the axis of rotation of the tire (indicated with the aid of reference 3 in FIG. 4) and which has an intersection with the bead filler 110 at a radial distance r from the radially innermost point 71 of the bead wire 70.

Figure 11:
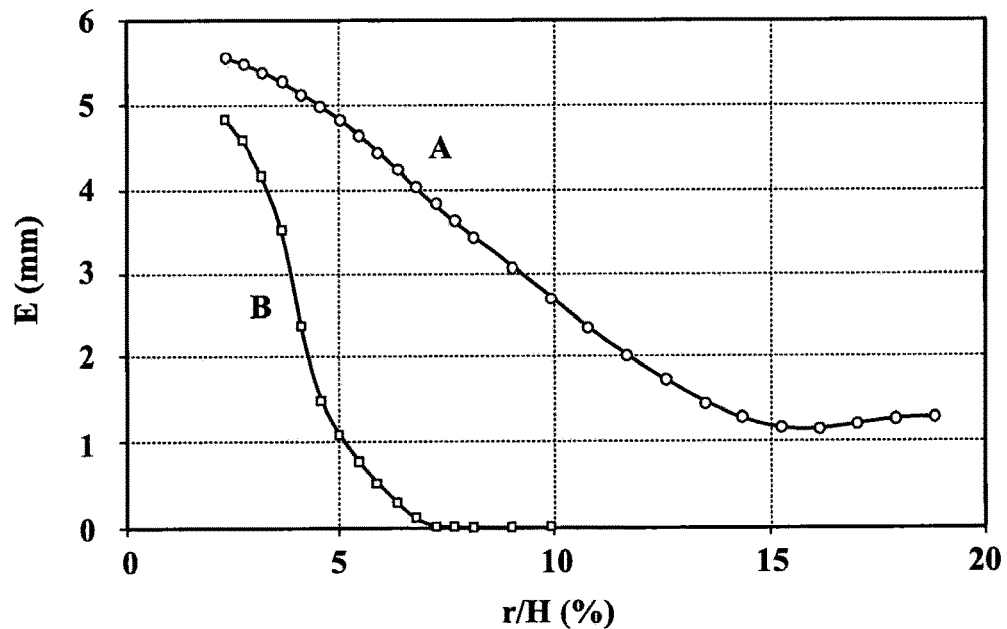
FIGS. 11 and 12 represent the thickness of the bead filler of the tire represented in FIG. 5 and its variation.
Figure 12:
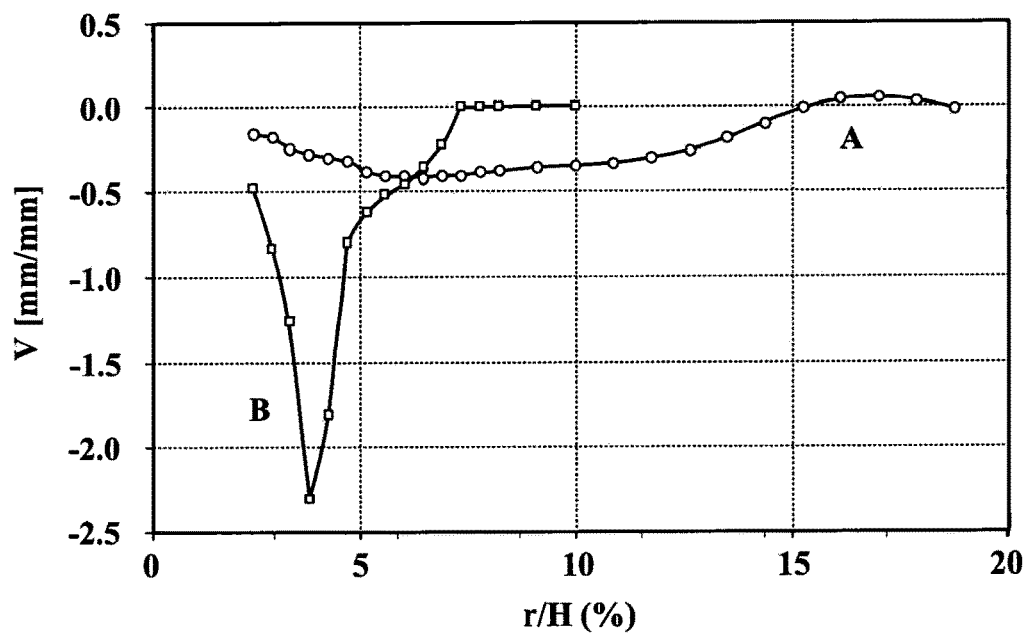

The value of the axial thickness E(r) of the bead filler 110 of the tire represented in FIG. 5 is plotted in FIG. 11 (curve B) and compared to the value of the axial thickness E(r) of the bead filler 110 of the reference tire represented in FIG. 3 (curve A). FIG. 12 compares the variation in the thickness $$\frac{\partial E(r)}{\partial r}$$

for the two bead fillers. It appears that the bead filler represented in FIG. 5 corresponds to one particular embodiment according to which the value of the axial thickness E(r) is such that, in the range of distances r between 0% and 10% of the radial height H of the tire, the variation of the thickness $$\frac{\partial E(r)}{\partial r}$$

is less than or equal to −0.5 mm/mm over slightly more than 3% of the radial height H of the tire. In this case, the variation of the axial thickness $$\frac{\partial E(r)}{\partial r}$$

is actually less than or equal to −1 mm/mm over 1.5% of the radial height H of the tire.

Figure 10:
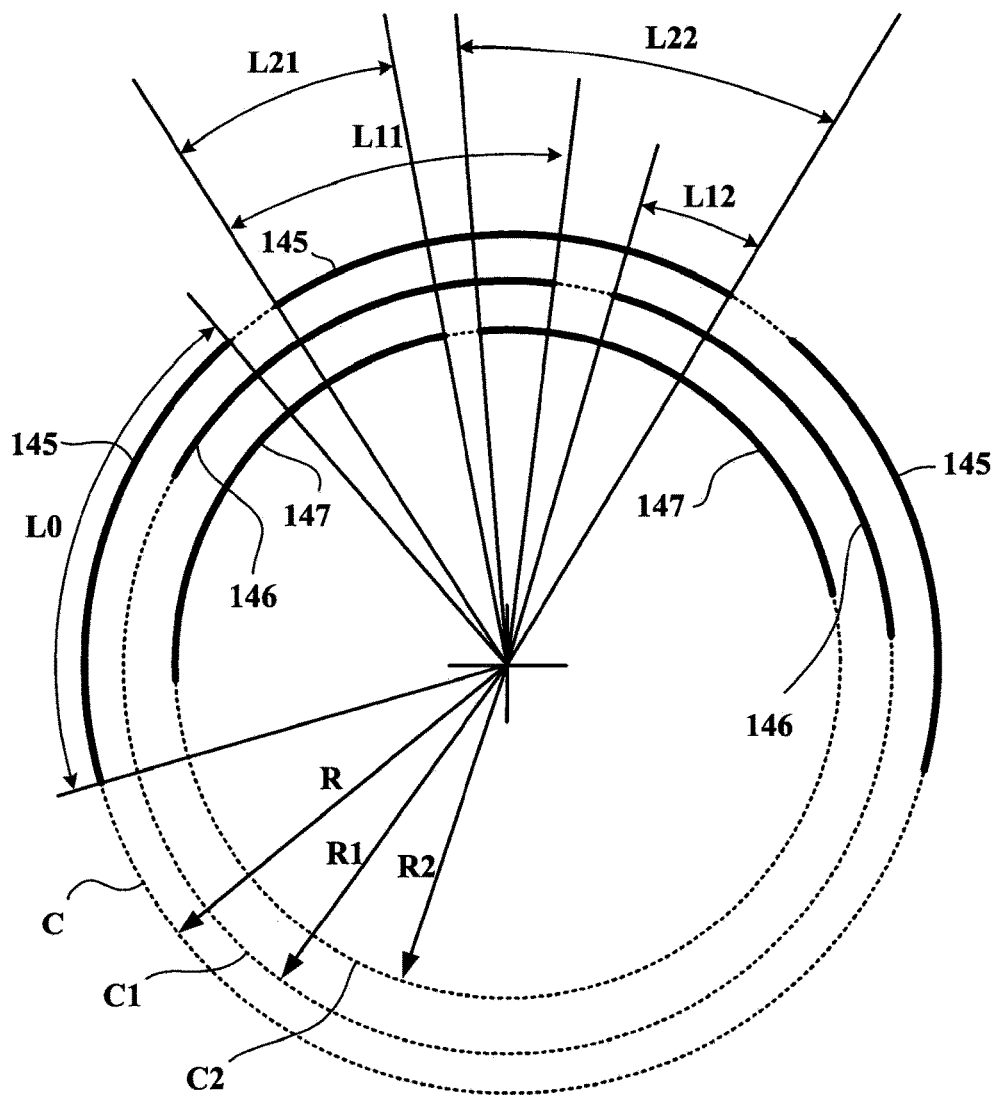
FIG. 10 shows the arrangement of the reinforcements of a ply of the rigidifying reinforcement used in the beads of the tires represented in FIGS. 5 and 6.

The rigidifying reinforcement 140 of the tire 10 represented in FIG. 5 is composed of a plurality of discontinuous reinforcing elements, these reinforcing elements being positioned in a plurality of circles (C, C1, C2) which are concentric to the axis of rotation of the tire, each circle being defined by an average radius R, R1, R2 measured relative to the axis of rotation as is illustrated in FIG. 10. This is of course a simplified diagram, limited to three turns, for explaining the principle of the arrangement of the reinforcements. The rigidifying reinforcement may naturally comprise further turns.

FIG. 10 shows the arrangement of the reinforcing elements of the rigidifying reinforcement 140 of the tire 10 over three neighboring circles C, C1 and C2, each circle being centered about the axis of rotation of the assembly formed by the tire and the mounting rim. All the reinforcing elements are metallic and have substantially one and the same equal length L0, in the present case 125 mm. It should be noted, however, that the length L0 of a reinforcing element does not have to be the same for all of the reinforcing elements. The pitch between neighboring circles C, C1 and C2, in which the discontinuous reinforcing elements are positioned, is equal to the diameter of the reinforcing elements increased by at least 0.2 mm, and preferably by at least 0.5 mm.

Represented partially in FIG. 10 is the reinforcement 140 (see FIG. 5), the axis of rotation of the tire being perpendicular to the plane of the figure. It can be seen that a reinforcing element 145 of length L0 in the circle C of radius R is mechanically coupled over the arc lengths L11 and L12 where it overlaps with two reinforcing elements 146 of the circle C1 of radius R1 (R1 being less than R) adjacent to the circle C. The same reinforcing element 145 is coupled along arc lengths L21 and L22 where it overlaps with two reinforcing elements 147 of the circle C2 of radius R2 (R2 being less than R1) adjacent to the circle C1. In the case presented, the coupling lengths are: L11=87.9 mm (i.e. 70% of L0); L12=37.7 mm (i.e. 30% of L0); L21=50.2 mm (i.e. 40% of L0); L22=75.3 mm (i.e. 60% of L0). These coupling lengths bear out the relationship 1.5≤K≤4 with K=(1−L12/L0)/(1−L11/L0). Indeed, the value taken by K is 2.3 when the coupling values between a reinforcing element 145 of length L0 in the circle C and the reinforcing elements 146 of the circle C1 of radius R1 (R1 being less than R) adjacent to the circle C are considered.

It is readily apparent to a person with ordinary skill in the art how to incorporate the reinforcing elements into a tire. For example, the reinforcing elements can be applied one by one onto a shaped tire or on the tire material before conformation.

FIG. 6 represents, in radial section, a bead and a portion of the sidewall of a tire according to another embodiment of the invention. Unlike the tire 10 represented in FIG. 5, this tire comprises a rigidifying reinforcement 140 which does not extend down to the bead wire 70. Indeed, the radially inner end 141 of the rigidifying reinforcement 140 is at a radial height such that the distance DAI between the radially innermost point 71 of the bead wire 70 and the radially inner end 141 of the rigidifying reinforcement 140 is equal to 16% of the radial height H of the tire.

The tire is mounted on a mounting rim 5 which comprises a part that forms a rim seat and that has radially on the outside a rim flange 6 of substantially circular profile. The center of the circle (which defines the "center of the rim flange" 6) is indicated with the aid of the reference J. The radially outer end 142 of the rigidifying reinforcement 140 is located on a straight line J2 that passes through the center J of the center of the rim flange and makes an angle α (alpha) that is open axially toward the inside and radially toward the outside, the angle α (alpha) being here equal to 114°.

Figure 7:
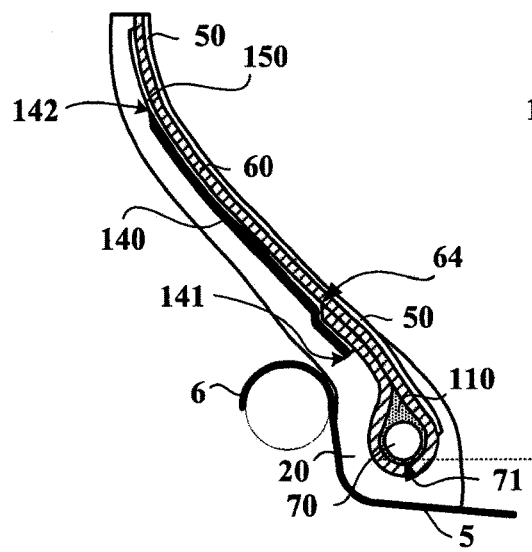
Figure 8:
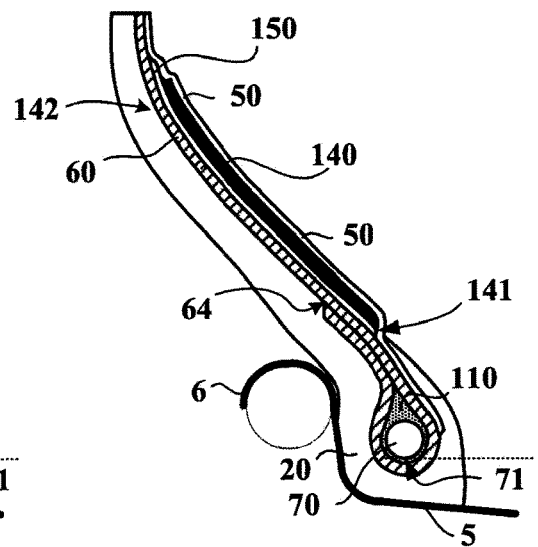

FIGS. 7 and 8 represent, in radial section, a bead and a portion of other embodiments of the invention. FIG. 7 illustrates the fact that in a tire according to an embodiment of the invention, the rigidifying reinforcement 140 may be extended axially on the outside of the turn-up of the carcass reinforcement 60. FIG. 8 shows that the rigidifying reinforcement 140 is not necessarily axially on the outside of the carcass reinforcement 60 but may be positioned axially on the inside of the latter.

A tire according to an embodiment of the invention, corresponding to the tire represented in FIG. 5, and a reference tire, corresponding to the tire represented in FIG. 3, have been compared when rolling (study dimension: 205/55 R16). The tire represented in FIG. 5 obtained an improvement in the rolling resistance of 0.4 kg per ton relative to the reference tire, while having the same cornering stiffness, at the same load and at the same inflation pressure. Table II shows this same result relative to the rolling resistance of the reference tire.

TABLE II

| Variant | Value of the rolling resistance as base 100 |
| --- | --- |
| Reference | 100 |
| Tire according to the invention | 95 |

The invention claimed is:

1. A tire comprising:
two beads shaped and positioned to come into contact with a standard mounting rim, each bead comprising at least one annular reinforcing structure;
two sidewalls extending from the beads radially outward, the two sidewalls joining in a crown comprising a crown reinforcement, surmounted by a tread; and
a carcass reinforcement extending from the beads through the sidewalls to the crown, the carcass reinforcement comprising a plurality of carcass reinforcing elements and being anchored in the two beads by a turn-up around the at least one annular reinforcing structure in such a way as to form in each bead a main portion and a wrapped-around portion, each wrapped-around portion extending radially outward to an end located at a radial distance DRE from a radially innermost point of the at least one annular reinforcing structure of the bead, the radial distance DRE being greater than or equal to 5% and less than or equal to 20% of a radial height H of the tire, wherein the radial height H of the tire is a radial distance from the radially innermost point of the at least one annular reinforcing structure of the bead to a radially outermost point of the tread when the tire is mounted on the standard mounting rim and is inflated to a working pressure;
wherein each bead comprises a bead filler formed from a rubber compound, the bead filler being located, at least partially, radially outside of the at least one annular reinforcing structure and at least partially between the main portion and the wrapped-around portion of the carcass reinforcement, the bead filler extending radially up to a radial distance DBE from the radially innermost point of the at least one annular reinforcing structure of the bead, the radial distance DBE being less than or equal to 10% of the radial height H of the tire,
wherein a sidewall of the tire at any radial height less than or equal to 40% of the radial height H of the tire also comprises a single rigidifying reinforcement formed from a plurality of metal reinforcing elements oriented along an angle less than or equal to 10 degrees relative to a circumferential direction of the tire, said rigidifying reinforcement being positioned such that the distance DAE between the radially innermost point of the at least one annular reinforcing structure and the radially outer end of the rigidifying reinforcement is greater than or equal to 20% and less than or equal to 40% of the radial height H of the tire and such that the distance DAI between the radially innermost point of the at least one annular reinforcing structure and the radially inner end of the rigidifying reinforcement is less than or equal to 20% of the radial height H of the tire, and
wherein the rigidifying reinforcement is entirely radially outside of the radially innermost point of the at least one annular reinforcing structure, and
wherein the rigidifying reinforcement is partially sandwiched between and contacting the main portion of the carcass reinforcement and the wrapped-around portion of the carcass reinforcement.

2. The tire of claim 1, wherein the radial distance DRE is greater than or equal to 7% and less than or equal to 18% of the radial height H of the tire.

3. The tire of claim 1, wherein the distance DAE between the radially innermost point of the at least one annular reinforcing structure and the radially outer end of the rigidifying reinforcement is greater than or equal to 25% and less than or equal to 35% of the radial height H of the tire.

4. The tire of claim 1, wherein the rigidifying reinforcement is composed of a plurality of discontinuous reinforcing elements positioned in a plurality of circles (C, C1, C2) concentric to the axis of rotation of the tire.

5. The tire of claim 1, wherein the rigidifying reinforcement is composed of a plurality of discontinuous reinforcing elements of length L0, these reinforcing elements being positioned in a plurality of circles (C, C1, C2) concentric to the axis of rotation of the tire mounted on its rim, each circle being defined by an average radius (R, R1, R2) measured relative to said axis of rotation, each discontinuous reinforcing element of length L0 located in a circle C of radius R being mechanically coupled over the coupling lengths L11 and L12, respectively, with two discontinuous reinforcing elements located in a circle C1 of radius R1 less than the radius R, said circle being immediately adjacent to the circle C, wherein the coupling lengths L11 and L12, L11 being greater than or equal to L12, bear out the following relationship: $1.5 \leq K \leq 4$ with $K=(1-L12/L0)/(1-L11/L0)$.

6. The tire of claim 5, wherein:
(a) the coupling length L11 is greater than or equal to 55% of L0 and less than or equal to 75% of L0, and the coupling length L12 is greater than or equal to 10% of L0 and less than or equal to 30% of L0; and (b) each discontinuous reinforcing element of length L0 located in a circle C of radius R is mechanically coupled over coupling lengths L21 and L22 with two discontinuous reinforcing elements located in a circle C2 of radius R2 less than the radius R1, the circle immediately adjacent to the circle C1, the coupling length L21 being greater than or equal to 20% of L0 and less than or equal to 40% of L0, and the coupling length L22 being greater than or equal to 45% of L0 and less than or equal to 65% of L0.

7. The tire of claim 6, wherein said mounting rim comprises a part that forms a rim seat comprising a rim flange of circular profile, and wherein the radially outer end of the rigidifying reinforcement is located on a straight line J2 that passes through the center J of the profile of the rim flange and makes an angle α that is open axially toward the inside and radially toward the outside, the angle α being greater than or equal to 90° and less than or equal to 120°.

8. The tire of claim 7, wherein the angle α is greater than or equal to 100° and less than or equal to 115°.

9. The tire of claim 1, wherein the rigidifying reinforcement contacts the at least one annular reinforcing structure.

10. A tire comprising:
two beads shaped and positioned to come into contact with a standard mounting rim, each bead comprising at least one annular reinforcing structure;
two sidewalls extending from the beads radially outward, the two sidewalls joining in a crown comprising a crown reinforcement, surmounted by a tread; and
a carcass reinforcement extending from the beads through the sidewalls to the crown, the carcass reinforcement comprising a plurality of carcass reinforcing elements and being anchored in the two beads by a turn-up around the at least one annular reinforcing structure in such a way as to form in each bead a main portion and a wrapped-around portion, each wrapped-around portion extending radially outward to an end located at a radial distance DRE from a radially innermost point of the at least one annular reinforcing structure of the bead, the radial distance DRE being greater than or equal to 5% and less than or equal to 20% of a radial height H of the tire, wherein the radial height H of the tire is a radial distance from the radially innermost point of the at least one annular reinforcing structure of the bead to a radially outermost point of the tread when the tire is mounted on the standard mounting rim and is inflated to a working pressure;
wherein each bead comprises a bead filler formed from a rubber compound, the bead filler being located, at least partially, radially outside of the at least one annular reinforcing structure and at least partially between the main portion and the wrapped-around portion of the carcass reinforcement, the bead filler extending radially up to a radial distance DBE from the radially innermost point of the at least one annular reinforcing structure of the bead, the radial distance DBE being less than or equal to 10% of the radial height H of the tire,
wherein a sidewall of the tire at any radial height less than or equal to 40% of the radial height H of the tire also comprises a rigidifying reinforcement formed from a plurality of metal reinforcing elements oriented along an angle less than or equal to 10 degrees relative to a circumferential direction of the tire, said rigidifying reinforcement being positioned such that the distance DAE between the radially innermost point of the at least one annular reinforcing structure and the radially outer end of the rigidifying reinforcement is greater than or equal to 20% and less than or equal to 40% of the radial height H of the tire and such that the distance DAI between the radially innermost point of the at least one annular reinforcing structure and the radially inner end of the rigidifying reinforcement is less than or equal to 20% of the radial height H of the tire, and
wherein the bead filler has an axial thickness E(r), this thickness being the length of the intersection of the bead filler with a straight line parallel to the axis of rotation of the tire and having an intersection with the bead filler at a radial distance r from the radially innermost point of the at least one annular reinforcing structure, the thickness E(r) being such that, in the range of distances r between 0% and 10% of the radial height H of the tire, the variation of the thickness $$\frac{\partial E(r)}{\partial r}$$

is less than or equal to 0.5 mm/mm over at least 3% of the radial height H of the tire.

11. A tire comprising:
two beads shaped and positioned to come into contact with a standard mounting rim, each bead comprising at least one annular reinforcing structure;
two sidewalls extending from the beads radially outward, the two sidewalls joining in a crown comprising a crown reinforcement, surmounted by a tread; and
a carcass reinforcement extending from the beads through the sidewalls to the crown, the carcass reinforcement comprising a plurality of carcass reinforcing elements and being anchored in the two beads by a turn-up around the at least one annular reinforcing structure in such a way as to form in each bead a main portion and a wrapped-around portion, each wrapped-around portion extending radially outward to an end located at a radial distance DRE from the radially innermost point of the at least one annular reinforcing structure of the bead, the radial distance DRE being greater than or equal to 5% and less than or equal to 20% of the radial height H of the tire, wherein the radial height H of the tire is a radial distance from the radially innermost point of the at least one annular reinforcing structure of the bead to a radially outermost point of the tread when the tire is mounted on the standard mounting rim and is inflated to a working pressure;
wherein each bead comprises a bead filler formed from a rubber compound, the bead filler being located, at least partially, radially outside of the at least one annular reinforcing structure and at least partially between the main portion and the wrapped-around portion of the carcass reinforcement, the bead filler extending radially up to a radial distance DBE from a radially innermost point of the at least one annular reinforcing structure of the bead, the radial distance DBE being less than or equal to 10% of a radial height H of the tire,
wherein a sidewall of the tire at any radial height less than or equal to 40% of the radial height H of the tire also comprises a rigidifying reinforcement formed from a plurality of metal reinforcing elements oriented along an angle less than or equal to 10 degrees relative to a circumferential direction of the tire, said rigidifying reinforcement being positioned such that the distance DAE between the radially innermost point of the at least one annular reinforcing structure and the radially outer end of the rigidifying reinforcement is greater than or equal to 20% and less than or equal to 40% of the radial height H of the tire and such that the distance DAI between the radially innermost point of the at least one annular reinforcing structure and the radially inner end of the rigidifying reinforcement is less than or equal to 20% of the radial height H of the tire, and wherein the bead filler has an axial thickness E(r), this axial thickness being the length of the intersection of the bead filler with a straight line parallel to the axis of rotation of the tire and having an intersection with the bead filler at a radial distance r from the radially innermost point of the at least one annular reinforcing structure, the value of the axial thickness E(r) being such that, in the range of distances r between 0% and 10% of the radial height H of the tire, the variation of the axial thickness $$\frac{\partial E(r)}{\partial r}$$

is less than or equal to 1 mm/mm over at least 1.5% of the radial height H of the tire.

* * * * *